July 26, 1966

A. E. SCHOTT 3,262,326

CONTROL APPARATUS

Filed Nov. 7, 1962

INVENTOR.
ARTHUR E. SCHOTT

BY Roger W. Jensen

ATTORNEY

July 26, 1966 A. E. SCHOTT 3,262,326
CONTROL APPARATUS
Filed Nov. 7, 1962 3 Sheets-Sheet 2

NORMAL OPERATION

ROTOR NOT SUSPENDED

INVENTOR.
ARTHUR E. SCHOTT
BY Roger W. Jensen
ATTORNEY

July 26, 1966  A. E. SCHOTT  3,262,326
CONTROL APPARATUS

Filed Nov. 7, 1962  3 Sheets-Sheet 3

INVENTOR.
ARTHUR E. SCHOTT
BY
Roger W. Jensen
ATTORNEY

United States Patent Office 3,262,326
Patented July 26, 1966

3,262,326
CONTROL APPARATUS
Arthur E. Schott, Mounds View, Minn., assignor to Honeywell Inc., a corporation of Delaware
Filed Nov. 7, 1962, Ser. No. 236,074
5 Claims. (Cl. 74—5)

This invention pertains to inertial instruments and more particularly to gyroscopes and accelerometers whose rotor or seismic mass is universally supported by means of electrostatic fields between said rotor and an array of electrodes arranged to envelope said rotor. Still more particularly this invention pertains to provide the initial levitation of the rotor to the center of the electrode cavity in an inertial instrument using a resonant suspension.

In a resonant suspension the rotor to electrode voltages and corresponding forces are extremely frequency dependent since the electrode to rotor capacitance is actually part of a high Q L-C resonant loop. In addition the frequency response curve for this L-C loop shifts along the frequency axis as the resonant frequency changes with the change in the position of the rotor. For sufficiently large forces to be generated it is necessary that the resonant frequency of the L-C loop is substantially in tune with the operating frequency of the system, however, when the rotor is at rest at the bottom of the electrode cavity the capacitance between the top electrodes is considerably less than that required to tune the upper electrode channel to resonance. The L-C frequency response curve is substantially below the normal operating frequency of the oscillator and the forces generated are not sufficient to cause levitation of the rotor. In order to lift the rotor to the center of the electrode structure, the necessary voltage can be obtained by resonance. This invention provides for automatic levitation of said rotor by operating initially at the higher driving frequency and gradually sweeping the frequency from above the resonant frequency of the top channel to the nominal operating frequency.

It is therefore an object of this invention to provide on improved inertial instrument.

Further, it is the object of this invention to provide automatic levitation for the inertial member of an inertial instrument using resonant electrostatic suspension.

These and further objects of my invention will be apparent to those skilled in the art upon consideration of the accompanying specification, claims, and drawings of which:

Figure 1:
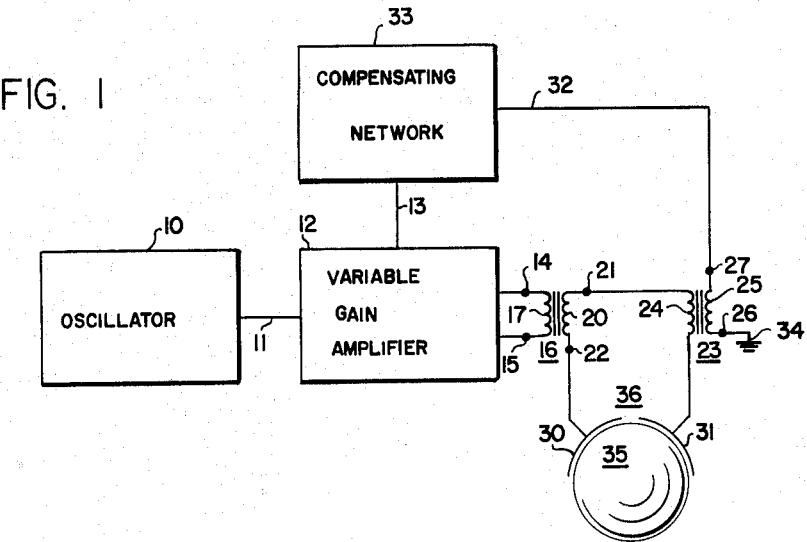
FIGURE 1 is a schematic diagram of one channel of a resonant suspension system.

Referring now to FIGURE 1, there is shown an oscillator 10 having an output 11 feeding into a variable gain amplifier 12. Output terminals 14 and 15 of variable gain amplifier 12 are connected to a primary winding 17 of a transformer 16. Transformer 16 further has a secondary winding 20 with terminals 21 and 22. Terminal 22 of secondary winding 20 is connected directly to a rotor supporting electrode 30 and terminal 21 of winding 20 is connected through primary winding 24 of a transformer 23 to a rotor supporting electrode 31. A substantially spherically shaped rotor 35 provides a path for the electric field between support electrodes 30 and 31. The combination of electrodes 30 and 31 together with rotor 35 constitute a variable capacitive reactance. The magnitude of the capacitive reactance varies with the position of rotor 35. As rotor 35 moves away from the electrode pair the electrode to rotor gap increases, decreasing the capacitance between the surfaces of the electrodes and the rotor, thus, increasing the capacitive reactance. The converse is true when the rotor moves toward the electrode pair.

Transformer 23 further has a secondary winding 25 with terminals 26 and 27. Terminal 27 of winding 25 is connected to a compensating network 33 by means of a connector 32. Terminal 26 of winding 25 is connected directly to ground 34. Compensating network 33 further has an output 13 directly connected to variable gain amplifier 12.

The variable gain amplifier 12 and the compensating network 33 may be of the type shown in the copending application, Serial No. 224,453 by Paul Senstad also assigned to the assignee of this invention.

Figure 2:
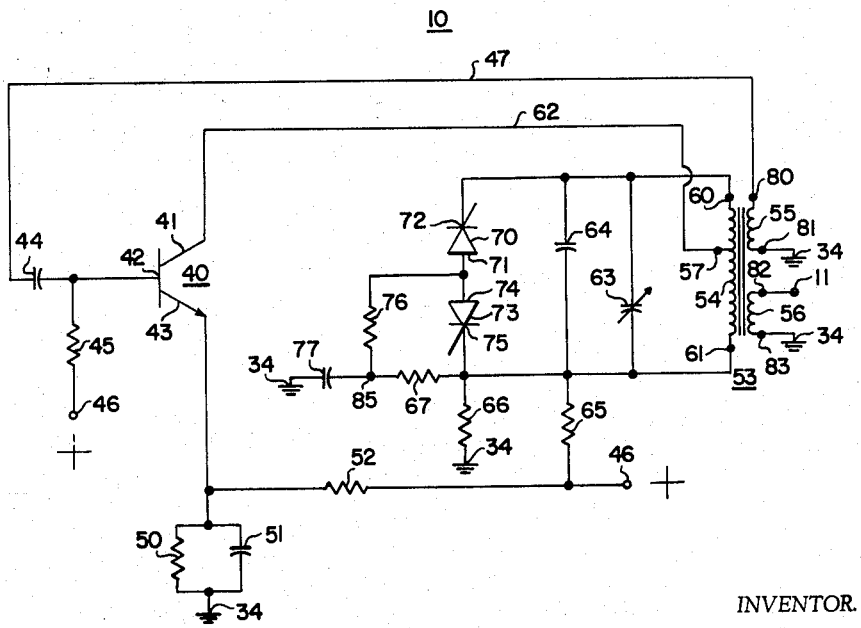
FIGURE 2 shows an oscillator including the invention herein described, the oscillator being usable in the system of FIGURE 1.

In FIGURE 2 oscillator 10 is shown in more detail and comprises a transistor 40 having a collector 41, a base 42, and an emitter 43. Collector 41 is connected to an intermediate tap 57 of a primary winding 54 of a transformer 53 by means of a conductor 62. The base 42 of transistor 40 is connected to a positive potential 46 through a resistor 45 and to an end terminal 80 of a secondary winding 55 of a transformer 53 through a capacitor 44 by means of a conductor 47. The emitter 43 of transistor 40 is connected to ground 34 through a parallel combination of a capacitor 51 and a resistor 50 and to positive potential 46 through a resistor 52. The primary winding 54 of transformer 53 further has end terminals 60 and 61. Terminal 61 of primary winding 54 is connected to positive potential 46 through a resistor 65 and to ground 34 through a resistor 66. End terminal 61 of primary winding 54 is further connected to end terminal 60 of primary winding 54 through a parallel combination of a variable capacitor 63 and a capacitor 64. End terminal 60 of primary winding 54 is also connected to cathode 72 of a Varicap 70 (voltage variable capacitor-diode) and end terminal 61 is connected to cathode 75 of a Varicap 73. Annode 71 of Varicap 70 is connected directly to annode 74 of Varicap 73 and to a terminal 85 through resistor 76. Terminal 85 is connected to ground 34 through capacitor 77 and to cathode 75 of Varicap 73 through resistor 67. The secondary winding 55 of transformer 53 further has an end terminal 81 connected directly to ground 34. Transformer 53 also has a secondary winding 56 with end terminals 82 and 83. End terminal 83 is connected directly to ground 34 and end terminal 82 is connected to an output terminal 11.

Figure 5:
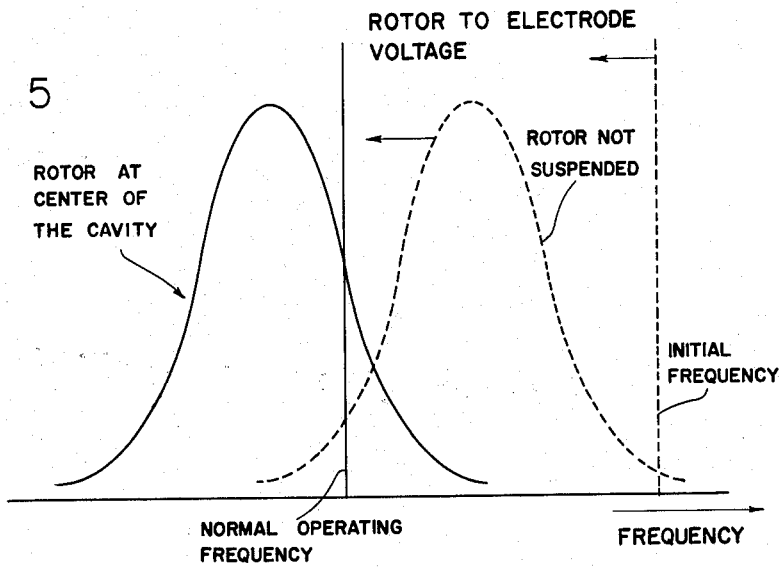
FIGURE 5 shows the relative position on the frequency axis of the resonant curves with the rotor in operating position and with the rotor not in suspension and their relation to the normal operating frequency of the oscillator. It also shows the initial frequency of the oscillator during automatic levitation cycle.
Figure 6:
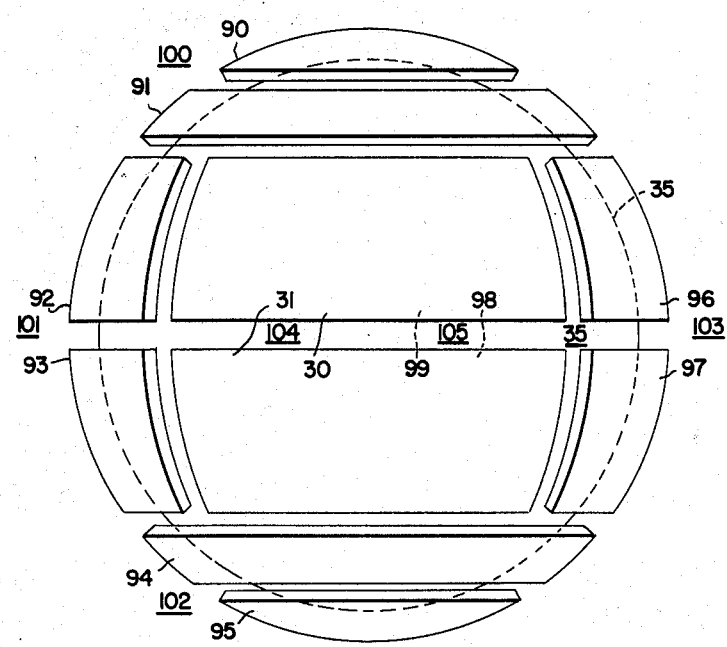
FIGURE 6 shows one possible arrangement of the rotor supporting electrodes.

Referring now to FIGURE 6, a typical configuration of electrodes surrounding rotor 35 is depicted. Electrodes 30 and 31 comprising electrode pair 104 are the same as electrodes 30 and 31 of FIGURE 1. Electrodes 98 and 99 constitute an electrode pair 105 positioned diametrically opposite the electrode pair 104. An electrode pair 100 comprised of electrodes 90 and 91 is positioned diametrically opposite an electrode pair 102 comprised of electrodes 94 and 95. Similarly an electrode pair 101 comprised of electrodes 92 and 93 is diametrically opposed to an electrode pair 103 comprised of electrodes 96 and 97. The net force on the rotor due to electrostatic forces between electrode pair 100 and the rotor 35 and the electrode pair 102 and the rotor 35 acts along the axis of electrode pairs 100 and 102 through the center of the rotor 35. Similarly, the net force produced by the electrostatic forces between electrode pair 101 and rotor 35 and electrode pair 103 and rotor 35 acts along the axis of the electrode pairs 101 and 103 through the center of the rotor 35. In the same manner the net force due to the electrostatic forces between the electrode pair 104 and rotor 35 and electrode pair 105 and rotor 35 acts along the axis of the electrode pairs 104 and 105 through the center of the rotor 35. As it can be seen the forces due to the six pairs of electrodes act along three mutually orthogonal axes X, Y, and Z as shown in FIGURE 5.

For use of the invention in an application to a gyroscope, a means such as that shown in the Nordsieck Patent 3,003,356 for initially spinning the inertial member about a spin axis and a pickoff means such as shown in the Kunz Patent 2,959,060 for measuring the relative motion of the spin axis of the inertial member and the housing bearing the supporting electrodes may be incorporated in the instrument.

*Operation*

Figure 3:
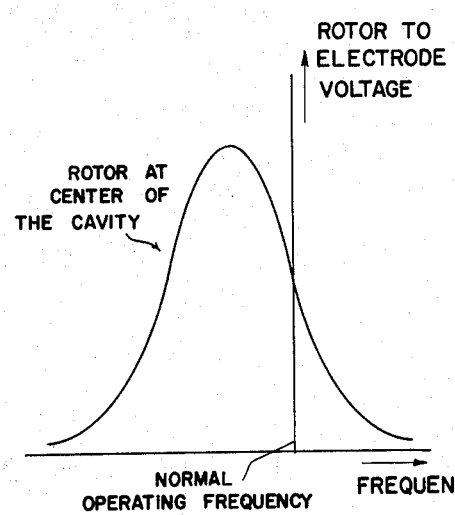
FIGURE 3 shows the L-C loop frequency response curve with the suspension in the normal operating condition.
Figure 4:
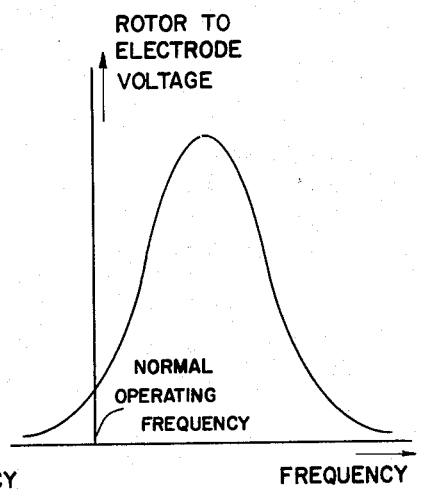
FIGURE 4 shows the L-C loop frequency response curve with the rotor not in suspension as related to the normal oscillator frequency.

In FIGURE 1 rotor 35 is part of an L-C tuned circuit 36 with a high Q. Typical frequency response curves or resonance curves for such an L-C circuit are shown in FIGURES 3, 4, and 5. It can be seen that any change in driving frequency or shift of the response curve along the frequency axis will cause variation in the rotor to electrode voltage and therefore will correspondingly vary the forces between the rotor and the electrodes. In the rotor support system shown in FIGURE 1, the operating frequency of oscillator 10 providing an input signal to the variable gain amplifier 12 is constant during the normal operation of the system and the rotor restoring forces are derived from the shifting of the L-C resonance curve along the frequency axis, increasing the force if the resonance frequency becomes more tuned to the oscillator frequency, and decreasing the force if the circuit is detuned. For the circuit to function properly the frequency of the oscillator 10 should be somewhat higher than the resonant frequency of the tuned L-C circuit 36. The optimum condition is to have oscillator frequency about one-half bandwidth above the resonance frequency at the condition when the rotor is positioned in the center of the electrode cavity. The slope of the resonance curve is highest at that point, therefore allowing maximum changes in forces per rotor displacement and providing stiffer suspension. It is important that the operating point exists on the portion of the resonance curve with a negative slope and at no time during the operation of the suspension system should the resonant frequency of L-C circuit 36 be higher than the frequency of signal oscillator 10 since that condition would place the operating point on the positive slope of the curve and precipitate the collapse of the rotor suspension.

In FIGURE 1 oscillator 10 is providing an output signal which is fed by conducting means 11 to a variable gain amplifier 12. The variable gain amplifier 12 can be any one of the standard amplifiers well-known to those skilled in the art. In variable gain amplifier 12 the signal is amplified and impressed on primary winding 17 of transformer 16 between terminals 14 and 15. The primary winding 17 of transformer 16 energizes the secondary winding 20 which is part of resonance loop 36 comprised of secondary winding 20 of transformer 16 in series with primary winding 24 of transformer 23 and the variable capacitive reactance comprised of electrodes 30 and 31 together with rotor 35.

The resonant frequency of L-C tuned circuit 36 and the frequency of the oscillator 10 are adjusted so that the frequency of the oscillator 10 is higher than the resonant frequency by about one-half bandwidth of the resonant curve when the rotor is in the desired position. This is shown in FIGURE 3 which depicts the normal operation of the system.

The resonance frequency $\omega_r$ follows the well-known relationship of $$\omega_r = \frac{K}{\sqrt{LC}}$$

where K is a constant and L and C are the total values of inductance and capacitance respectively in the circuit. In case here the inductance L is also a constant and the frequency is seen to vary only with the change in capacitance due to rotor movement. If the rotor moves toward the electrodes, the capacitance of the electrode combination increases and the resonance frequency of L-C network 36 decreases, shifting the resonance curve along the frequency axis away from the oscillator frequency, thus decreasing the rotor to electrode voltages, since the forces are proportional to the voltages, this effectively decreases the rotor to electrode forces. This is illustrated in FIGURE 3.

If the rotor moves away from the electrods, the electrode to rotor capacitance decreases and the resonant frequency increases, shifting the resonance curve toward the oscillator frequency and increasing the rotor to electrode voltages and corresponding forces.

For the purpose of illustration only one channel of electronics is shown here. An identical channel is acting on the rotor at a position diametrically opposed to electrodes 30 and 31 with electrodes 98 and 99 as shown in FIGURE 6, so that as the rotor moves away from the electrodes on one side, it moves toward the electrodes on the other side. The attractive force increases on the side with increasing rotor to electrode gap and decreases on the side with decreasing gap thus tending to maintain the rotor suspended at a position where the forces are balanced.

Figure 7:
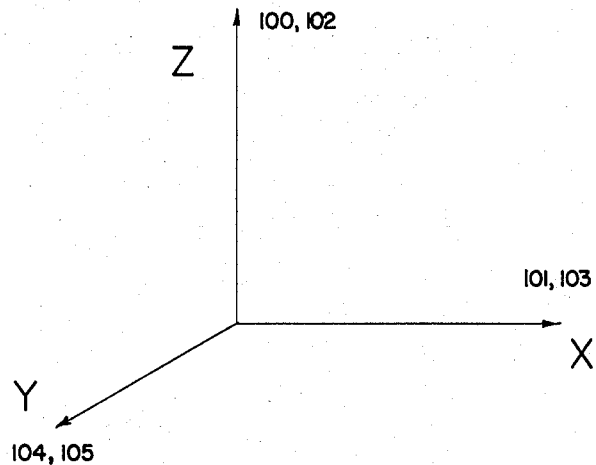
FIGURE 7 is a set of orthogonal axes showing the direction of forces in an electrostatic support system using the electrode configuration of FIGURE 6.

One possible arrangement for stable suspension is to have the electrode configuration shown in FIGURE 6 with six pairs of electrodes producing suspension forces along three mutually orthogonal axes as shown in FIGURE 7.

When rotor 35 is resting at the bottom of the electrode cavity, for example on electrodes 94 and 95 in FIGURE 6, capacitance between the top electrodes 90 and 91 is, as mentioned before, considerably less than that required to tune the upper electrode channel to resonance. The resonance curve of the L–C loop is substantially above the normal operating frequency of the oscillator on the part of the resonant curve with a positive slope which as previously indicated does not allow suspension. In order to lift the rotor to the center of the electrode structure, the necessary voltage can be obtained by initially using a higher operating frequency to place the operating point on the negative slope of the resonance curve as shown by dotted lines in FIGURE 5. The frequency can then be swept down to the normal operating level while rotor 35 is levitated simultaneously. Obviously to accomplish this end the oscillator 10 of FIGURE 1 must vary the frequency of its output signal during the levitation procedure. How this is accomplished will be described with reference to FIGURE 2.

The oscillator 10 of FIGURE 2 is a simple, emitter oriented feedback oscillator. The basic theory of operation of such oscillators is well-known to those skilled in the art. A description of its operation, however, can be found on page 274 of Fitchen, F. C., Transistor Circuit Analysis and Design, D. Van Nostrand Company, Inc., Princeton, New Jersey, 1960. The frequency of the oscillator is controlled by the total capacitance of the tank circuit which is the series parallel combination of Varicaps 70 and 73 and capacitors 63 and 64. The Varicaps provide a changing capacitance to vary the frequency of the oscillator. They exhibit a relatively low capacitance when the voltage across them is large and a higher capacitance when the voltage is reduced. When the gyro suspension is energized, the D.C. voltage is applied to the circuit. Capacitor 77, having previously been discharged through resistors 67 and 66, has a zero charge. The voltage at terminals 85 is zero and the since the value of resistor 76 is much smaller than the value of resistor 67 practically all of the voltage appears between the cathode 75 and the anode 74 of Varicap 73 and cathode 72 and anode 71 of Varicap 70. The Varicaps exhibit a relatively small capacitance and since the frequency of the oscillator is inversely proportional to the square root of the capacitance the frequency is relatively high. As the capacitor 77 charges, however, the voltage across the Varicaps decreases and their capacitances increase, consequently, decreasing the output frequency of the oscillator. In normal operation capacitor 77 remains charged and the frequency remains constant once the initial levitation is completed. If the suspension should for any reason collapse, capacitor 77 must be allowed to discharge before levitation is again attempted.

It is understood that the specific embodiment of my invention shown is only for the purpose of illustration, and that my invention is limited only by the scope of the appended claims.

I claim as my invention:

1. In an inertial system having an electrically conductive member and a plurality of pairs of member supporting electrodes generally disposed about and adjacent to said member, means connected to said electrodes for levitating said member, said member levitating means for each electrode pair comprising:
    inductive means including a transformer having a primary winding means and a secondary winding means;
    means connecting said secondary winding means to one of said electrode pairs, said secondary winding means and the capacitance between said member and said electrodes forming a resonant L-C circuit;
    means including a variable gain amplifier means connected to said primary winding means for establishing supporting potentials between said electrodes and said member;
    and a variable frequency signal generating means, having a characteristic operating frequency somewhat higher than the resonant frequency of said L-C tuned loop when said member is equally displaced from said supporting electrodes, connected to said amplifier means for automatically causing the initial levitation of said member by sweeping the frequency during the levitation cycle from a frequency higher than said characteristic operating frequency down to said characteristic operation frequency.

2. In an inertial system having an electrically conductive sphere and a plurality of pairs of sphere supporting electrodes generally disposed about and adjacent to said sphere, means connected to said electrodes for levitating said sphere, said sphere levitating means for each electrode pair comprising:
    inductive means including a transformer having a primary winding means and a secondary winding means;
    means connecting said secondary winding means to one of said electrode pairs, said secondary winding means and the capacitance between said sphere and the electrodes forming a resonant L-C circuit;
    means including a variable gain amplifier means connected to said primary winding means for establishing supporting potentials between said electrodes and said sphere;
    and a variable frequency signal generating means, having a characteristic operating frequency somewhat higher than the resonant frequency of said resonant L-C tuned loop when the sphere is equally displaced from said supporting electrodes connected to said amplifier means for automatically causing the initial levitation of said sphere by sweeping the frequency during the levitation cycle from a frequency higher than said characteristic operating frequency down to said characteristic operating frequency.

3. In an inertial system having an electrically conductive member and a plurality of pairs of member supporting electrodes generally disposed about and adjacent to said member, means connected to said electrodes for levitating said member, said member levitating means for each electrode pair comprising:
    inductive means connected to said electrode pair, said inductive means and the capacitance between said member and said electrodes forming a resonant L-C loop;
    means including a variable frequency signal generating means and an amplifier means operatively connected to said inductive means for establishing time varying supporting potentials having a characteristic operating frequency somewhat higher than the resonant frequency of said L-C tuned loop when said member is equally displaced from said supporting electrodes, said signal generating means automatically causing the initial levitation of said member by sweeping the frequency during the levitation cycle from a frequency higher than said characteristic operating frequency down to said characteristic operating frequency.

4. In an inertial system having an electrically conductive sphere and a plurality of pairs of sphere supporting electrodes generally disposed about and adjacent to said sphere, means connected to said electrodes for levitating said sphere, said sphere levitating means for each electrode pair comprising:
    inductive means connected to said electrode pair, said inductive means and the capacitance between said sphere and said electrodes forming a resonant L-C loop;
    means including a variable frequency signal generating means and an amplifier means operatively connected to said inductive means for establishing time varying supporting potentials having a characteristic operating frequency somewhat higher than the resonant frequency of said L-C tuned loop when said sphere is equally displaced from said supporting electrodes, said signal generating means automatically causing the initial levitation of said sphere by sweeping the frequency during the levitation cycle from a frequency higher than said characteristic operating frequency down to said characteristic operating frequency.

5. In a resonant suspension for an inertial instrument:
    an electrically conductive member;
    a plurailty of electrodes positioned adjacent to said member;
    inductive means connected to said electrodes, said inductive means together with the capacitance between said member and said electrodes forming a L-C loop having a characteristic resonant frequency; and variable frequency signal generating means and an amplifier means operatively connected to said electrodes to initially provide an alternating supporting voltage of a substantially higher frequency than said characteristic resonant frequency, and to subsequently provide an alternating supporting voltage of a frequency appropriate for the maintenance of steady state operation.

References Cited by the Examiner

UNITED STATES PATENTS

| | | | |
|---|---|---|---|
| 2,942,479 | 6/1960 | Hollmann | 74—5 X |
| 3,003,356 | 10/1961 | Nordsieck | 74—5 |
| 3,098,679 | 7/1963 | De Boice | 74—5 X |

MILTON KAUFMAN, *Primary Examiner.*

BROUGHTON G. DURHAM, *Examiner.*

P. W. SULLIVAN, *Assistant Examiner.*